A. H. NELLER.
OVERHEAD CARRIER.
APPLICATION FILED MAR. 6, 1914.

1,200,393.

Patented Oct. 3, 1916.
2 SHEETS—SHEET 1.

WITNESSES:

INVENTOR
Albert H. Neller,
BY
William Louden
ATTORNEY

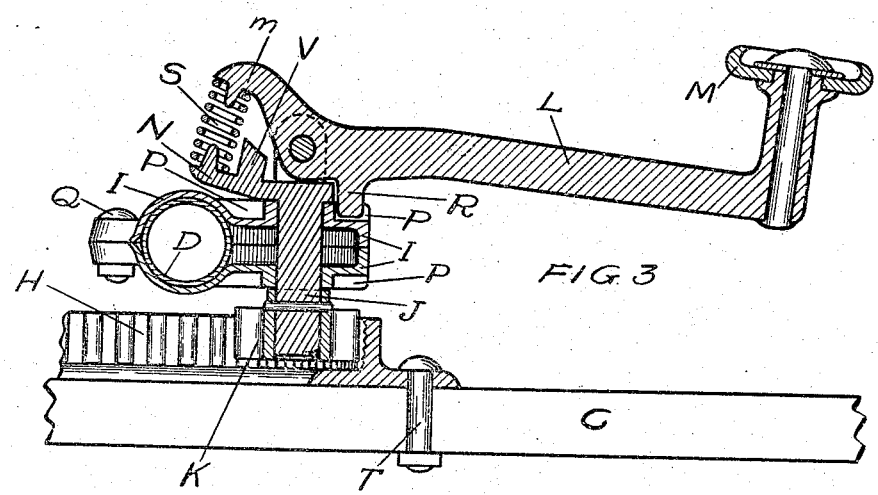
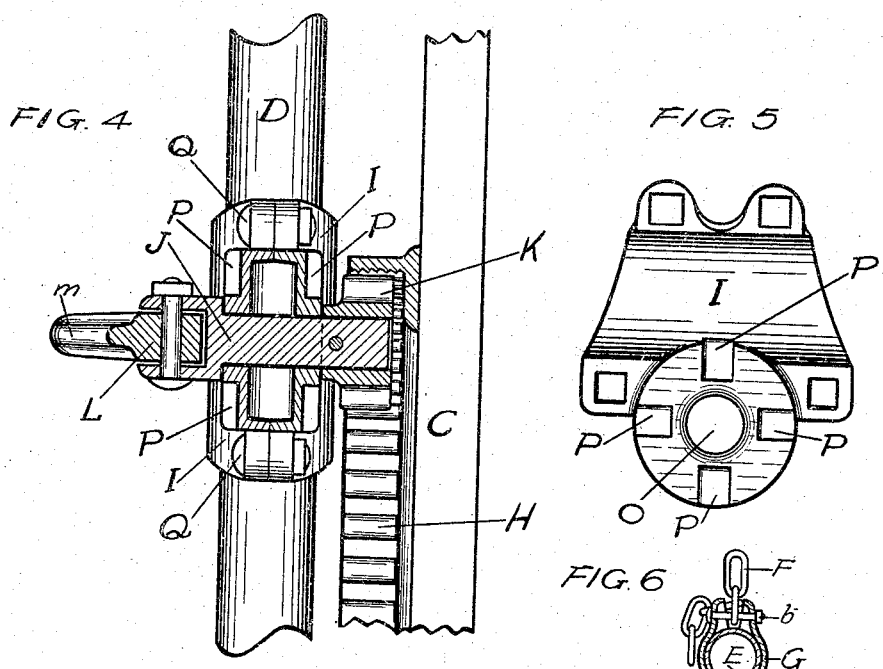

UNITED STATES PATENT OFFICE.

ALBERT H. NELLER, OF FAIRFIELD, IOWA, ASSIGNOR TO LOUDEN MACHINERY COMPANY, OF FAIRFIELD, IOWA, A CORPORATION OF IOWA.

OVERHEAD CARRIER.

1,200,393.

Specification of Letters Patent.

Patented Oct. 3, 1916.

Application filed March 6, 1914. Serial No. 823,012.

*To all whom it may concern:*

Be it known that I, ALBERT H. NELLER, a citizen of the United States, residing at Fairfield, in the county of Jefferson and State of Iowa, have invented a new and useful Improvement in Overhead Carriers, of which the following is a specification.

My invention relates to overhead carriers for conveying and distributing feed and other material and it consists of an improvement whereby the receptacle may be manually rotated to the side to discharge the feed or other material, and be held in an upright position, or in tilted positions of different degrees. Also, of other features set forth herein and more specifically defined in the claims.

Figure 1:
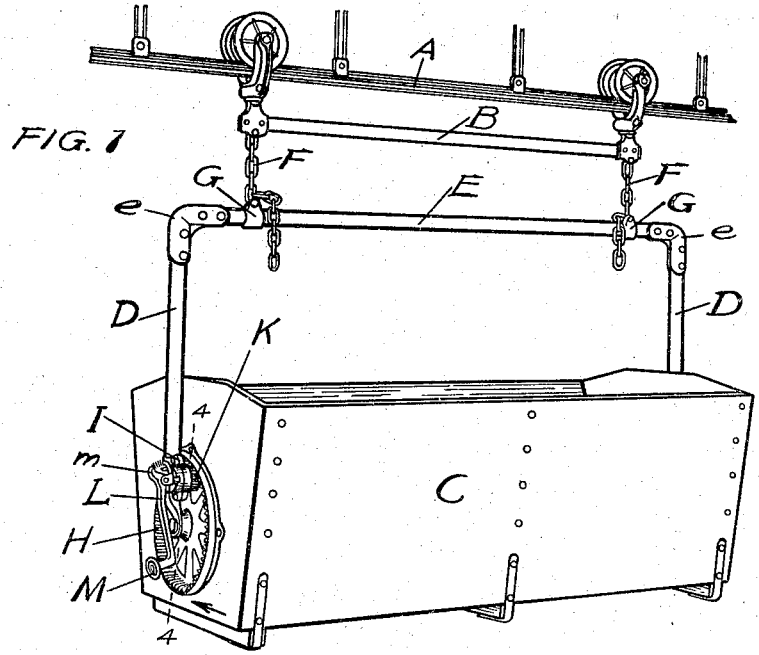
Figure 2:
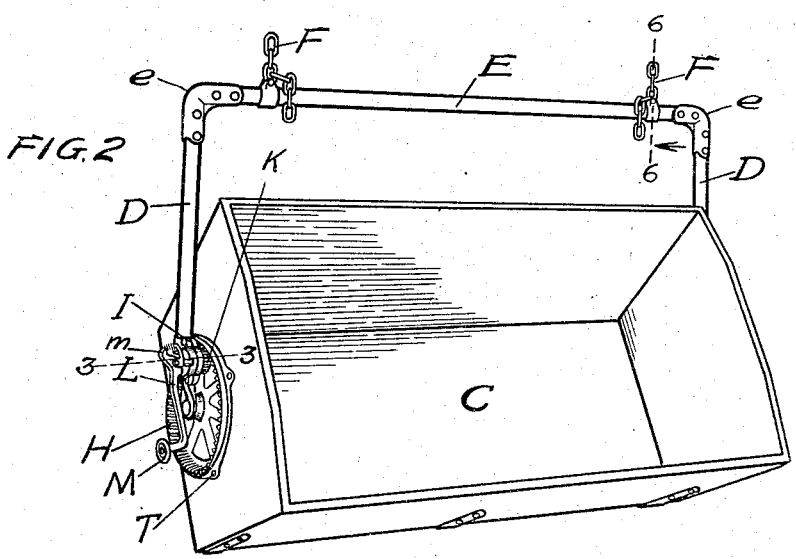

In the accompanying drawings forming a part of this specification, Figure 1 is a perspective of a feed carrier embodying my invention. Fig. 2 is the same showing the feed receptacle in a tilted position, the track and carriage being omitted. Fig. 3 is an enlarged horizontal section on line 3—3 of Fig. 2, the operating crank being turned one-quarter way around to the right to bring it on said line. Fig. 4 is an enlarged vertical section on line 4—4 of Fig. 1, looking in the direction of the arrow, the operating crank being turned one-quarter way around to bring it crosswise on said line. Fig. 5 is an enlarged detail. Fig. 6 is a transverse section on line 6—6 of Fig. 2.

Referring to the drawings, A represents an overhead track, with suspending hangers shown broken away. A carrier comprising a pair of trucks connected together below the track by a bar B and having wheels spaced apart to pass the hangers, is mounted on the track in the usual manner.

C is a rectangular shaped receptacle pivotally connected to a bail consisting of two pendent portions D, connected together at their upper ends to a top rail E by elbows *e*. The bail is attached to the carriage B by chains F which are connected at their lower ends to clevises G adjustably clamped to the top rail E and at their upper ends, to the frame of the carrier. By this means the receptacle with its bail may be made as much longer than the carriage as desired, and the clevises may be adjusted on the top rail to suit the length of the carriage. Also, the distance between the carriage and the top rail may be adjusted by inserting the bolts *b* which clamp the clevises on the rail in different links of the chain, as shown by Fig. 6. If preferred the adjustment of the length of the chains may be made where they are connected to the carrier frame instead of at the clevises.

The receptacle C is connected to the bail by pivot castings secured to each of its ends near the centers thereof and having pivot pins mounted in eyes in the lower ends D. On one end of the receptacle a gear H is attached. It is preferably made integral with the pivot casting on that end of the receptacle, the latter forming the hub of the gear. They may be made separate if desired but the pivot casting should be directly in the center of the gear. A member preferably composed of two castings I, both alike, is clamped upon the pendent portion of the bail at the end having the gear. A short shaft or axle J is mounted in this member and carries on its inner end a pinion K arranged to mesh in or with the gear H which is secured to the end of the receptacle.

To the outstanding end of the shaft, a crank L is pivoted so as to rotate the shaft and at the same time have a certain amount of free outward and inward movement. The outer end of the shaft is preferably forked and the crank is pivoted between the forks so as to have a long and a short end. The long end is preferably provided with a revoluble head or hand-hold M for turning the crank. The short end *m* is extended outwardly and is provided with an inwardly projecting point adapted to hold one end of a coiled spring. The outer end of the shaft J is fitted with a lateral extension N which has an outwardly extending point to correspond with the inwardly extending point on the crank end *m* and between these points a coiled compression spring S is inserted.

The castings I are provided with a series of recesses or pockets P arranged at equal distances from the opening O in which the shaft J is mounted. On the inner side of the long end of the crank L and at a distance from the center of the shaft J to correspond with said pockets is a tooth or spur R adapted to enter the pockets, one at a time, and be held in engagement therewith by means of the spring S, as shown in Fig. 3.

By pulling out on the crank head or handhold M the tension of the spring will be overcome and the spur R will be freed from the pockets and be free to rotate carrying with it the shaft J and pinion K attached thereto.

The rotating of the pinion with the shaft and crank, all of which are secured to the pendent portion of the bail adjacent to the gear H, (which is secured to the end of the receptacle), and the pinion meshing in the gear will cause the receptacle to revolve or tilt on its pivots supported by the lower ends of the bail. Fig. 2 shows the receptacle tilted to one side, which was caused by a turn of the crank from the position shown in Fig. 1. Another turn of the crank in the same direction will cause the receptacle to tilt nearly upside down and continued revolutions of the crank will cause it to rotate entirely around, which will bring it back to the position shown in Fig. 1. By turning the crank in the opposite direction, the receptacle will be rotated to the other side.

The crank can be turned only when the head M is held out to keep the spur R clear of the pocket P. When it is not so held the spring S will force the spur R into one of the pockets and the pinion K will be held against further rotation and the receptacle will be held in whatever position it may occupy at the time. By this means the receptacle can be held in any desired position, either that shown by Fig. 1, which may be called the loaded position, or that shown by Fig. 2, which may be called a partially dumped position, or in any other position desired by simply pulling out the head M and rotating the crank L and then letting the spring S force the spur R back into one of the pockets P.

The castings I are clamped upon the pendent portions D by means of bolts Q and may be adjusted thereon to bring the pinion K into proper mesh with the gear H. It is preferable that the castings I be made exactly alike so that they will be interchangeable. In that way if the pockets on the outer casting should become worn, the inner casting may be changed to take its place. They are also spread apart where the opening O is located to furnish better bearings for the shaft J. The gear H may also be secured to the end of the receptacle by bolts I.

An outwardly projecting spur V may be formed on the lateral projection of the shaft J to form a stop for the short end of the crank L and thus prevent too great a pressure upon the spring S, or the points upon which it is mounted. The end of this spur is preferably beveled to fit the contour of the adjacent part of the crank L.

The entire apparatus is extremely simple and easily manipulated whereby the receptacle may be easily rotated to either side and held in any desired position.

The device is especially adapted to distributing feed a little at a time as the receptacle is passed along the mangers.

What I claim as new is:—

1. In overhead carriers having trucks to run on an overhead track and a bail with depending ends, a receptacle pivoted on its opposite ends to the lower ends of the bail, a gear on one end of the receptacle, a pinion journaled on the adjacent end of the bail to co-act with the gear on the end of the receptacle, and means to rotate the pinion and to thereby tilt the receptacle on its pivots.

2. In overhead carriers having trucks to run on an overhead track and a bail with depending ends, a receptacle pivoted on its opposite ends to the lower ends of the bail, a gear surrounding one of the pivots and co-acting with a pinion on the adjacent end of the bail and means to rotate the pinion and to thereby tilt the receptacle on its pivots.

3. In overhead carriers having trucks to run on an overhead track and a bail with depending ends, a receptacle pivoted on its opposite ends to the lower ends of the bail, a gear surrounding one of the pivots and co-acting with a pinion on the adjacent end of the bail, a crank to rotate the pinion and to thereby tilt the receptacle on its pivots.

4. In overhead carriers having a supporting bail and a receptacle pivoted on its ends between the lower ends of the bail, a gear secured to one end of the receptacle, a casting secured to the adjacent portion of the bail, an axle journaled in the casting, a pinion secured to the axle and meshing in the gear and a crank secured to the axle, whereby the gear may be rotated and the receptacle tilted on its pivots on the bail.

5. In overhead carriers having a supporting bail and a receptacle pivoted on its ends between the lower ends of the bail, a gear secured to one end of the receptacle, a casting secured to the adjacent portion of the bail and having pockets on its outer face, an axle journaled in the casting between the pockets, a pinion secured to the axle and meshing in the gear, a crank having a spur adapted to be moved into and out of the pockets, pivoted to the outer end of the axle so as to have outward and inward movement, and a spring adapted to move the crank on its pivot and hold the spur in engagement with a pocket in the casting.

6. In overhead carriers having trucks to run on an overhead track and a bail with depending ends, a receptacle pivoted on its opposite ends to the lower ends of the bail, a gear having a flange on one edge, means to secure the flange to the end of the receptacle and surrounding one of the pivots, a pinion journaled on the adjacent end of the bail to co-act with the gear, and means to rotate the pinion and to thereby tilt the receptacle on its pivots.

7. In overhead carriers having trucks to run on an overhead track and a bail with depending ends, a receptacle pivoted on its opposite ends to the lower ends of the bail, a gear surrounding and made integral with one of the pivot pins secured to the end of the receptacle, a pinion journaled on the adjacent end of the bail and co-acting with the gear, and means to rotate the pinion and to thereby tilt the receptacle on its pivot.

8. In a device of the character described, an overhead carrier comprising a pair of trucks mounted on an overhead track and connected together by a bar below the track, a bail having a horizontal portion and vertically depending ends, a receptacle pivoted on its ends to said depending ends of the bail, an adjustable clevis secured to the horizontal portion of the bail a distance from each of the depending ends, one end of a chain connected to each of the truck frames near the ends of the connecting bar, and the other ends of the chains connected to the clevises attached to the horizontal portion of the bail.

9. In a device of the character described, an overhead carrier comprising a pair of trucks mounted on an overhead track and connected together by a bar below the track, a bail having a horizontal portion and vertically depending ends, connected together by elbows, a receptacle pivoted on its ends to said depending ends of the bail, an adjustable clevis secured to the horizontal portion of the bail near each of the elbows, one end of a chain connected to each of the truck frames near the ends of the connecting bar, and the other ends of the chains connected to the clevises attached to the horizontal portion of the bail.

10. In a device of the character described, a receptacle pivotally mounted on a suitable support, a gear secured to one end of the receptacle inside of the support, and a pinion journaled on the support at right angles to the end of the receptacle carrying the gear and meshing with the gear to tilt the receptacle.

11. In a device of the character described, a receptacle pivotally mounted on a suitable support, a gear secured to one end of the receptacle inside of the support, a pinion journaled on the support at right angles to the end of the receptacle carrying the gear, and meshing with the gear to tilt the receptacle, and means to lock the gear and hold the receptacle against rotation in either direction.

Fairfield, Iowa, March 4, 1914.

ALBERT H. NELLER.

Witnesses:
 CARRIE L. BEEDLE,
 HENRY H. NIEMANN.